Patented Sept. 1, 1936

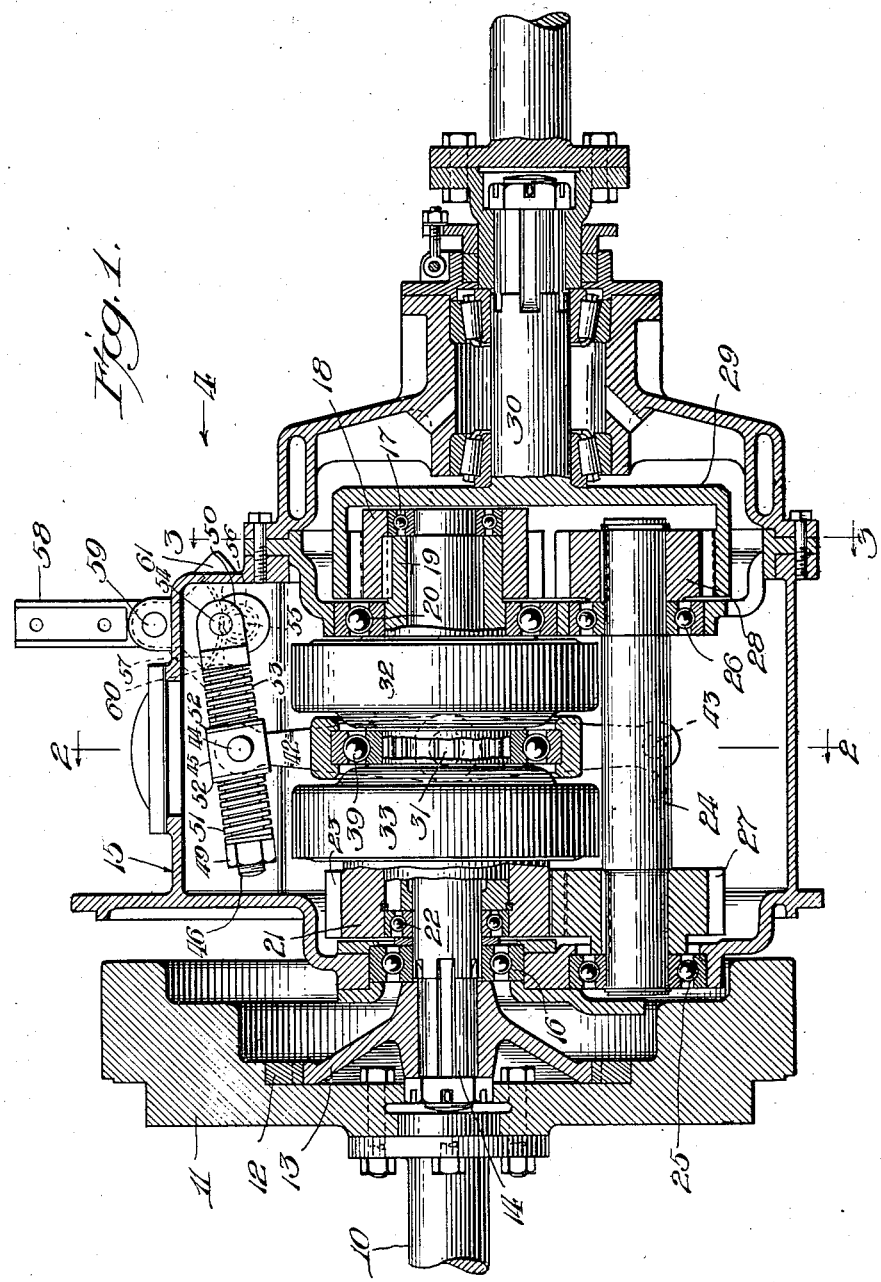

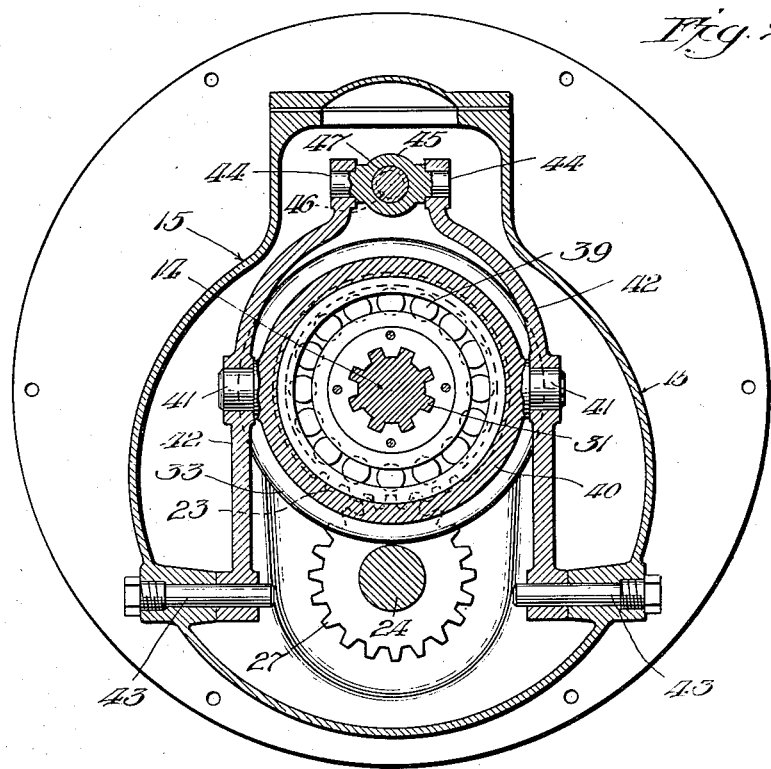

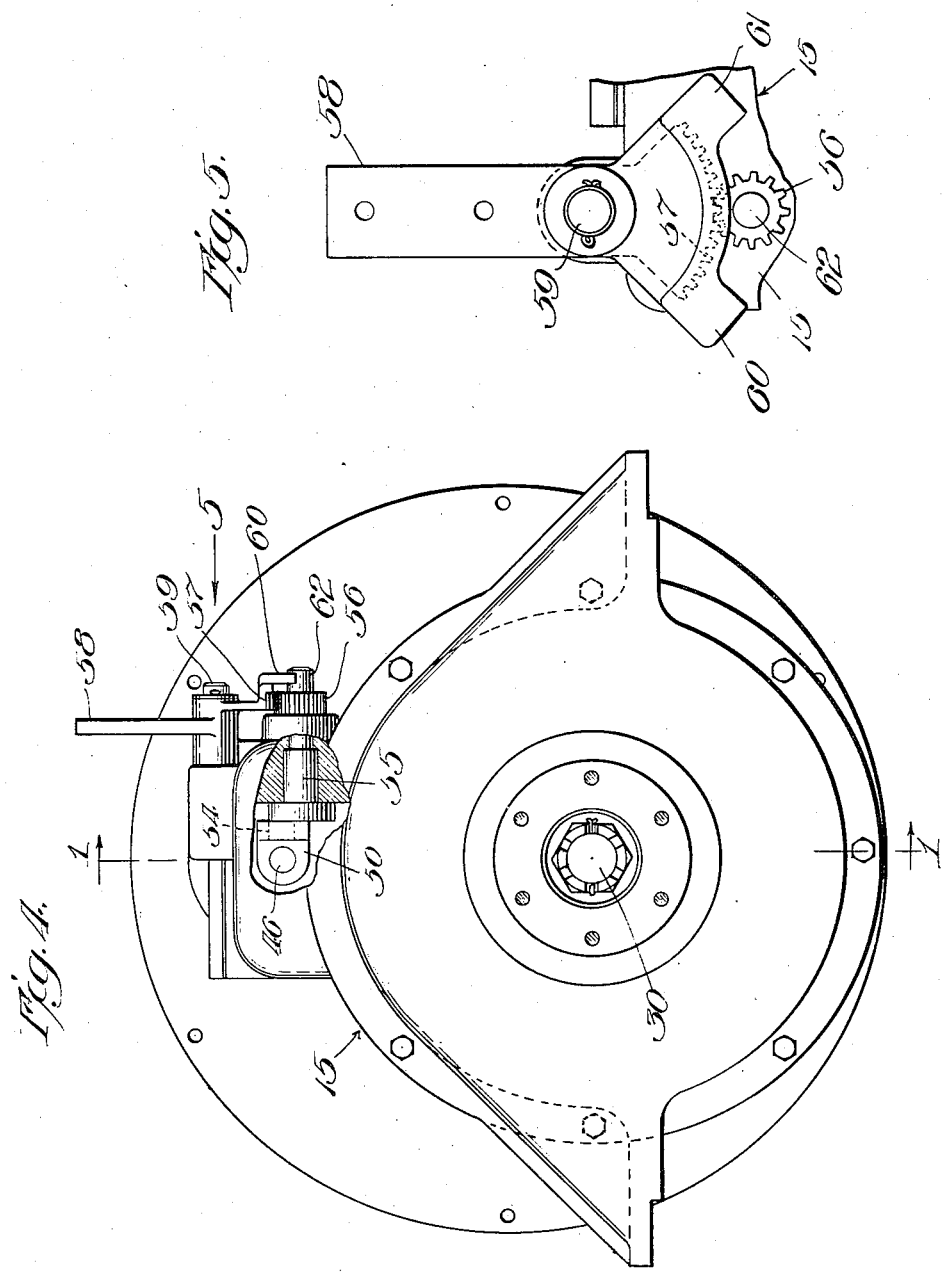

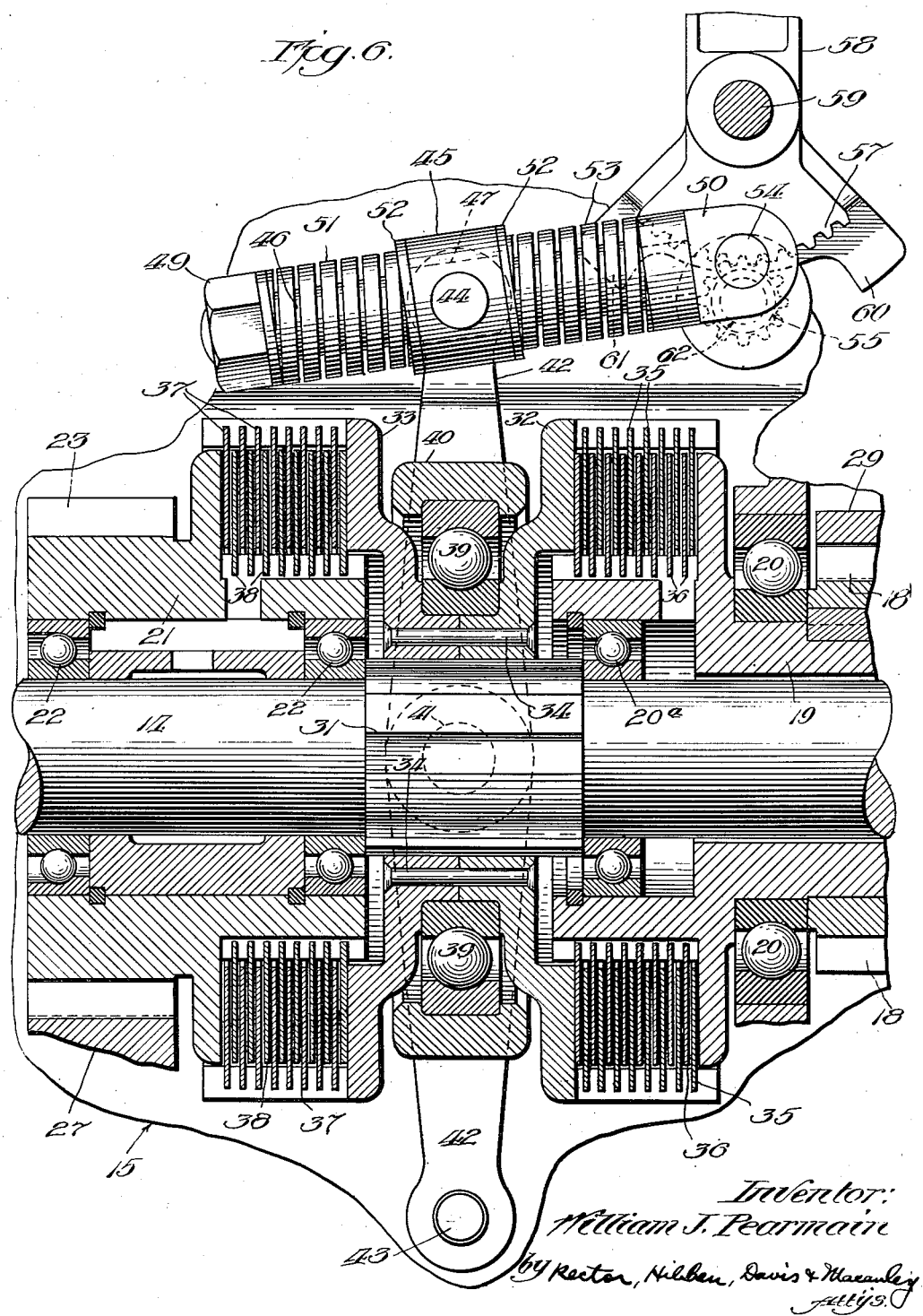

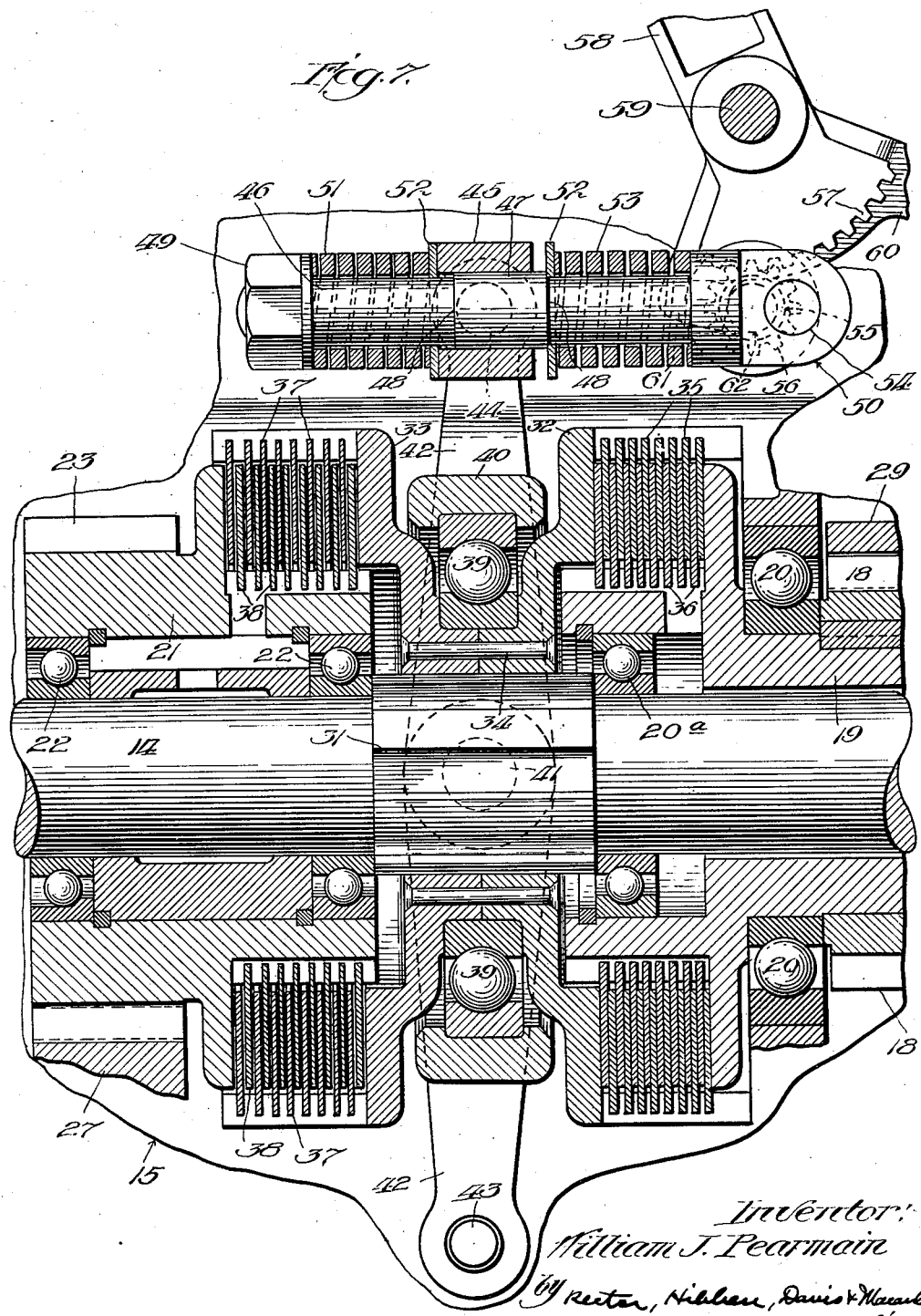

2,052,650

UNITED STATES PATENT OFFICE 2,052,650

CLUTCH MECHANISM

William J. Pearmain, Racine, Wis., assignor to Twin Disc Clutch Company, Racine, Wis., a corporation of Wisconsin Application January 18, 1934, Serial No. 707,093

5 Claims. (Cl. 192—21)

My invention relates to a clutch mechanism for effecting a transmission of power between driving and driven shafts and is more particularly concerned with providing a mechanism of this character of the spring loaded type.

In marine power installations, particularly those employing internal combustion engines, it is necessary to step down the revolution speed of the engine to a point that is satisfactory for the efficient operation of the propeller. Ordinarily, this reduction is effected through a suitable arrangement of gearing which includes a reversing device.

It is the principal object of my invention to devise a mechanism which incorporates direct and reverse driving gears whose selection is determined by the operation of clutches, one each for the direct and reverse drives, and which are spring-loaded and locked in their respective driving positions by the operation of throwing them into engagement, each clutch being free to assume a position out of engagement when in non-driving position.

A further object is to provide a clutch mechanism in which the shifting means is actuated by compressing the loading spring, which thereafter acts through the shifting means to maintain the associated clutch in engagement.

A further object is to devise a mechanism as set forth above which employs a pair of multiple disc clutches, one set of discs for each clutch being carried by a shiftable member common to both clutches, which member is positively driven by the main power source.

These and further objects of my invention will be set forth in the following specification, reference being had to the accompanying drawings, and the novel means by which said objects are effectuated will be definitely pointed out in the claims.

In the drawings:

Figure 1 is a sectional elevation of my improved mechanism as viewed along the line 1—1 in Fig. 4, looking in the direction of the arrows.

Fig. 2 is a section along the line 2—2 in Fig. 1, looking in the direction of the arrows, and showing the relation of the shifting fork to the clutch devices.

Fig. 3 is a section along the line 3—3 in Fig. 1, looking in the direction of the arrows, and showing the relation of the internal gear on the driven shaft to the direct and reverse gears forming part of the principal mechanism.

Fig. 4 is an end view, partly in section, of my improved mechanism, looking in the directon of the arrow 4 in Fig. 1.

Fig. 5 is an enlarged view of the operating handle for the mechanism, as viewed in the direction of the arrow 5 in Fig. 4.

Fig. 6 is an enlarged view of the clutch portion of the mechanism, as viewed in Fig. 1, the two clutches being shown in neutral position.

Fig. 7 is a view similar to Fig. 6, but showing the direct drive clutch in engagement and the manner in which the same is held in this position.

Referring to Fig. 1, the numeral 10 designates a driving shaft having a flywheel 11 attached to the end thereof. The flywheel is provided with an internal, toothed ring 12 which engages with a spider 13 that is fixed to the end of an intermediate shaft 14. The shaft 14 extends across the interior of a housing 15 which encloses my improved reverse and reduction mechanism and, adjacent the spider 13, is rotatably supported upon a ball bearing 16 that is mounted in the housing. The opposite end of the shaft 14 is rotatably supported in a ball bearing 17 that is carried by one end of a pinion 18 which in turn is fixed to a hub 19. This hub is free to rotate on the shaft 14 and is supported at one end upon a ball bearing 20 that is mounted in the housing 15 and at the opposite end by a ball bearing 20$^a$ which encircles the shaft 14. A hub 21 is rotatably supported on the shaft 14 by means of ball bearings 22 adjacent the spider end of the shaft and this hub is provided with a pinion 23. From the foregoing, it will be understood that the pinions 18 and 23 are freely mounted on the shaft 14 and these pinions may be positively actuated for driving purposes by the instrumentalities hereinafter described.

A countershaft 24 is rotatably supported in the housing 15 beside the shaft 14 on ball bearings 25 and 26 which are supported in the housing. Gears 27 and 28 are fixedly attached to the shaft 24, the former permanently meshing with the pinion 23 and the latter permanently meshing with an internal gear 29 which is fastened to a driven shaft 30 that projects without the housing 15 and may be suitably connected to a propeller or other type of shaft. The pinion 18 also permanently meshes with the internal gear 29 and it will be observed from Fig. 1 that the pinion 18 and gear 28 are located on opposite sides of the axis of the shaft 30, thus providing the maximum space for the reception of the last named pinion and gear.

Referring to Figs. 1 and 6, the shaft 14 is provided with an enlarged, splined portion 31 between the hubs 19 and 21 and mounted on said portion for axial movement therealong, but partaking of the rotary movement of the shaft 14, is a pair of drums 32 and 33 whose open ends face in opposite directions. These drums are fastened together by rivets 34 in order to provide a common, shiftable member and the drum 32 carries a plurality of friction discs 35 arranged in alternating relation to a plurality of similar discs 36 which are supported on the hub 19. The last named discs when engaged constitute the clutch through which a direct drive to the propeller shaft is obtained, as hereinafter described. Similarly, the drum 33 supports a plurality of friction discs 37 which are arranged in alternating relation to a plurality of friction discs 38 that are carried by the hub 21 and these discs constitute the reversing clutch of the mechanism.

A ball bearing 39 is clamped between the adjacent faces of the drums 32 and 33 and encircling the outer race of the bearing 39 is a yoke 40 having laterally extending trunnions 41 projecting from opposite sides thereof (see Fig. 2). Each arm 42 of a shifting fork pivotally engages a trunnion 41 and at its lower end is pivotally supported upon a pin 43 that is carried by the housing 15. The upper end of each arm 42 is pivotally connected to a stub arm 44 which projects laterally from a block 45 (see Figs. 2 and 6) whose movements to and fro, as hereinafter described, effect a rocking of the shifting fork on its pivots 43 and thereby throws either of the aforesaid clutches into engagement. In the relative positions shown in Fig. 6, these clutches occupy neutral or non-driving positions.

A bar 46 is slidably mounted in the block 45 with its ends projecting on opposite sides thereof, the central portion of the bar being enlarged as at 47 to thereby form a pair of annular shoulders 48 with the reduced extremities of the bar. The left end of the bar, as viewed in Fig. 6, has mounted thereon a nut 49, while the opposite end of the bar has attached thereto a block 50. A coil spring 51 encircles the bar between the nut 49 and a washer 52 which, in the position shown in Fig. 6, is seated both against the left face of the block 45 and the left shoulder 48. A similar coil spring 53 encircles the bar between the block 50 and a like washer 52 which is seated against the right face of the block 45. These springs are of equal strength.

The block 50 is pivotally mounted upon an eccentric pin 54 that forms part of a rock shaft 55 which extends through the casing 15 (see Fig. 4) and has attached to the outer end thereof a gear 56. This gear meshes with a sector gear 57 provided on the lower end of an operating handle 58 that is pivotally mounted as at 59 on the housing 15. The lower end of the handle is provided with stops 60 and 61 on opposite sides of the shaft 55 and which are intended to engage, as hereinafter described, with a reduced portion 62 of the shaft 55 which projects beyond the gear 56.

The operation of my improved reverse and reduction mechanism will now be described. Referring to Figs. 1 and 6, it will be assumed that the shaft 10 is rotating at some determined speed, which speed is in turn transmitted to the intermediate shaft 14 by the spider 13, and that the shifting fork occupies the neutral position shown in Fig. 6. In this position of the indicated parts, it will be noted that while the clutch drums 32 and 33 are rotating with the shaft 14, the shifting fork and the parts which operate the same permit this rotation by reason of the association of the yoke 40 with the outer race of the ball bearing 39.

If now it is decided to transmit a direct or forward drive to the driven shaft 30, the operating handle 58 will be rocked in a counter-clockwise direction, as viewed in Fig. 6 to thereby impart a movement of the eccentric pin 54 in a clockwise direction. This movement pulls the bar 46 through the block 45 and begins to compress the spring 51. When this spring has been sufficiently compress to effect a movement of the shifting fork toward the right, as viewed in Fig. 6, the latter movement will take place with a consequent shifting of the friction discs 35 into engagement with the discs 36. The limit of movement of the eccentric pin 54 is determined by the engagement of the stop 61 with the shaft portion 62 and, at this time, the eccentric pin will be slightly below a line joining the centers of the shaft 55 and the stub arm 44, thereby locking the spring 51 in its compressed position against its otherwise tendency to release and insuring that the pressure of the spring will maintain the aforesaid friction discs in engagement.

During the foregoing compression of the spring 51, it may be noted from a study of Fig. 7 that the spring 53 remains uncompressed, since the right hand washer 52 moves concurrently with the block 50 so that the distance between these elements remains unchanged.

With the right hand clutch in engagement, the drive from the shaft 10 is transmitted through the flywheel 11, spider 13, intermediate shaft 14, right hand clutch comprising the discs 35 and 36, hub 19, and pinion 18 to the internal gear 29 and then to the driven shaft 30.

If now it is desired to reverse the drive to the mechanism, the operating handle 58 will be rocked in a clockwise direction to thereby shift the eccentric pin 54 above and to the opposite side of the shaft 55 from that illustrated in Fig. 7 and, during this movement, the compression of the spring 51 will be released, and the spring 53 will be compressed, the limit of this movement being determined by the engagement of the stop 60 with the shaft portion 62. With the left hand clutch in engagement, the right hand clutch is thereby thrown out of engagement, thus leaving the pinion 18 to freely rotate on the shaft 14 and the drive from the shaft 10 will then take place through the following parts, the flywheel 10, spider 13, intermediate shaft 14, left hand clutch comprising the discs 37 and 38, pinion 23, gear 27, counter shaft 24 and pinion 28 to the internal gear 29 and then to the driven shaft 30.

The foregoing mechanism may be embodied in an arrangement that is quite compact and in which the loading springs for the clutch are compressed by the operation of throwing the clutches into engagement, the springs thereafter being held against their own tendency to release. Further, because the respective clutches are engaged by the simple operation of loading the respective springs which in turn are always under the control of the operator, the clutches may be thrown into engagement free of any tendency to grab or jerk. Also, the clutches being spring-loaded, will automatically compensate for any slight wear that may take place in operation. The construction above described is not restricted to the use of multiple disc clutches, but is also capable of adaptation to cone and single plate clutches and other types.

I claim:

1. In clutch mechanism, the combination of clutch devices connected to separate rotary parts, and means comprising a shiftable member connected to one of said devices for moving the same into driving engagement with the other device, a bar pivoted on the member and slidable relative thereto, a rock shaft having an eccentric pin, a block fastened to the bar and pivotally mounted on the pin, a coil spring encircling the bar between the block and member, means for rocking the shaft to thereby compress the spring and move the member, and means for stopping the rotation of the shaft when the pin reaches a position slightly beyond a line through the centers of the shaft and the bar pivots to thereby hold the spring against its tendency to release.

2. In clutch mechanism, the combination of a pair of clutches, and means for throwing either of the clutches into engagement comprising a shiftable member common to both clutches, a bar having enlarged ends pivoted at an intermediate point on the member and slidable relative thereto, a rock shaft having an eccentric pin, one of the bar ends being pivotally mounted on the pin, a pair of coil springs encircling the bar between the ends and member on opposite sides of the latter, means for rocking the shaft to thereby move the bar endwise to compress one of the springs and move the member to engage the associated clutch, and means for stopping the rotation of the shaft when the pin reaches a position slightly beyond a line through the centers of the shaft and the bar pivots to thereby hold the compressed spring against its tendency to release.

3. In clutch mechanism, the combination of clutch devices connected to separate rotary parts, means for drivably connecting the clutch devices at will comprising a member connected to one of the devices, a lever having a pivotal connection with the member, a bar having an enlarged end pivoted on and slidable through the lever, a coil spring encircling the bar between the end and lever, means for moving the bar to thereby compress the spring and move the member to place the devices in driving engagement with each other, and means for holding the bar against the extending action of the spring to thereby maintain the engagement of the devices for an indeterminate time.

4. In clutch mechanism, the combination of a pair of clutches, means for throwing at will either of the clutches into engagement comprising a member common to both clutches, a lever having a pivotal connection with the member, a bar having enlarged ends pivoted at an intermediate point on the lever and slidable relative thereto, a rock shaft having an eccentric pin, one of the bar ends being pivotally mounted on the pin, a pair of coil springs encircling the bar between the ends and lever on opposite sides of the latter, means for rocking the shaft to thereby move the bar endwise to compress one of the springs and move the member to engage the associated clutch, and means for stopping the rotation of the shaft when the pin reaches a position slightly beyond a line through the center of the shaft and the bar pivot to thereby hold the compressed spring against its tendency to release.

5. In clutch mechanism, the combination of clutch devices connected to separate rotary parts, means for engaging the devices at will comprising a member common to one of the devices, a lever having a pivotal connection with the member, a bar pivoted on the lever and slidable relative thereto, a rock shaft having an eccentric pin, a block fastened to the bar and pivotally mounted on the pin, a coil spring encircling the bar between the block and lever, means for rocking the shaft to thereby compress the spring and move the member, and means for stopping the rotation of the shaft when the pin reaches a position slightly beyond a line through the center of the shaft and the bar pivot to thereby hold the spring against its tendency to release.

WILLIAM J. PEARMAIN.